(12) United States Patent
Mazyar et al.

(10) Patent No.: US 11,981,855 B2
(45) Date of Patent: May 14, 2024

(54) COMPOSITIONS OF MATTER COMPRISING SUSPENDED NANOPARTICLES FUNCTIONALIZED WITH GLYMO OR GLYMO-LIKE GROUPS AND RELATED METHODS

(71) Applicant: Baker Hughes Oilfield Operations LLC, Houston, TX (US)

(72) Inventors: Oleg A. Mazyar, Katy, TX (US); Radhika Suresh, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 15 days.

(21) Appl. No.: 17/657,688

(22) Filed: Apr. 1, 2022

(65) Prior Publication Data

US 2023/0313019 A1 Oct. 5, 2023

(51) Int. Cl.
*C09K 8/035* (2006.01)
*C09K 8/22* (2006.01)
(Continued)

(52) U.S. Cl.
CPC ............... *C09K 8/035* (2013.01); *C09K 8/22* (2013.01); *C09K 8/52* (2013.01); *C09K 8/58* (2013.01); *C09K 2208/10* (2013.01)

(58) Field of Classification Search
None
See application file for complete search history.

(56) References Cited

U.S. PATENT DOCUMENTS 6,548,264 B1 4/2003 Tan et al.
7,129,277 B2 10/2006 Baran, Jr.
(Continued)

OTHER PUBLICATIONS

Azadgoleh et al., Stability of Silica Nanoparticle Dispersion in Brine Solution: an Experimental Study, Iranian Journal of Oil & Gas Science and Technology, vol. 3, No. 4, (2014), pp. 26-40.
(Continued)

*Primary Examiner* — John J Figueroa
(74) *Attorney, Agent, or Firm* — TraskBritt

(57) ABSTRACT

A composition of matter comprises a liquid and functionalized nanoparticles suspended in the liquid. At least some of the functionalized nanoparticles comprise nanoparticles of aluminosilica and have a chemical structure of:

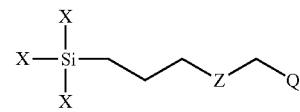

wherein at least one of the X's represents —O— bonded to a silicon (Si) atom or an aluminum (Al) atom of the aluminosilica of at least one of the nanoparticles; each other of the X's represents an additional —O— bonded to another silicon (Si) atom or another aluminum (Al) atom of the aluminosilica of at least one of the nanoparticles, an alkoxy group, an alkyl group, a hydroxyl group (OH), a hydrogen atom, or a halide; Z represents an oxygen (O) atom or an NH group; and Q represents an epoxide group, an aziridine group, a —CH(OH)CH$_2$OH group, a —CH(OH)CH$_2$NH$_2$ group, a —CH(NH)$_2$CH$_2$OH group, or a —CH(NH$_2$)CH$_2$NH$_2$ group. Methods of formation and of use are also disclosed.

20 Claims, 6 Drawing Sheets

(51) Int. Cl.
*C09K 8/52* (2006.01)
*C09K 8/58* (2006.01)

(56) References Cited

U.S. PATENT DOCUMENTS

| | | | |
|---|---|---|---|
| 7,357,979 | B2 | 4/2008 | Bringley et al. |
| 8,071,677 | B2 | 12/2011 | Chen et al. |
| 8,541,322 | B2 | 9/2013 | Barrera et al. |
| 8,617,306 | B2 | 12/2013 | Lambert et al. |
| 8,653,187 | B2 | 2/2014 | Butler et al. |
| 8,708,047 | B2 | 4/2014 | Chakraborty et al. |
| 8,808,567 | B2 | 8/2014 | Mazyar et al. |
| 8,840,693 | B2 | 9/2014 | Chakraborty et al. |
| 8,840,803 | B2 | 9/2014 | Mazyar et al. |
| 8,907,000 | B2 | 12/2014 | Khabashesku et al. |
| 8,991,498 | B2 | 3/2015 | Chakraborty et al. |
| 9,005,446 | B2 | 4/2015 | Mazyar |
| 9,012,377 | B2 | 4/2015 | Khabashesku et al. |
| 9,017,546 | B2 | 4/2015 | Mazyar et al. |
| 9,120,978 | B2 | 9/2015 | Mazyar et al. |
| 9,150,771 | B2 | 10/2015 | Mazyar et al. |
| 9,228,420 | B2 | 1/2016 | Mazyar et al. |
| 9,260,957 | B2 | 2/2016 | Commarieu et al. |
| 9,283,619 | B2 | 3/2016 | Mazyar et al. |
| 9,365,664 | B2 | 6/2016 | Schmidt et al. |
| 9,580,658 | B2 | 2/2017 | Kuznetsov et al. |
| 9,581,001 | B2 | 2/2017 | Mazyar et al. |
| 9,611,422 | B2 | 4/2017 | Suresh et al. |
| 9,611,699 | B2 | 4/2017 | Chakraborty et al. |
| 9,683,163 | B2 | 6/2017 | Mazyar et al. |
| 9,708,525 | B2 | 7/2017 | Suresh et al. |
| 9,708,896 | B2 | 7/2017 | Suresh et al. |
| 9,816,026 | B2 | 11/2017 | Mazyar et al. |
| 9,833,838 | B2 | 12/2017 | Mazyar et al. |
| 9,840,669 | B2 | 12/2017 | Kuznetsov et al. |
| 9,856,158 | B2 | 1/2018 | Mazyar et al. |
| 9,873,827 | B2 | 1/2018 | Chakraborty et al. |
| 9,879,511 | B2 | 1/2018 | Mazyar et al. |
| 9,885,226 | B2 | 2/2018 | Mazyar et al. |
| 9,902,896 | B2 | 2/2018 | Agrawal et al. |
| 10,702,843 | B2 * | 7/2020 | Suresh ................. C09D 17/001 |
| 11,149,184 | B2 * | 10/2021 | Kuznetsov ............. C09K 8/584 |
| 11,305,251 | B2 * | 4/2022 | Suresh ................... E21B 43/16 |
| 11,359,130 | B2 * | 6/2022 | Suresh ................... E21B 37/06 |
| 2010/0314108 | A1 | 12/2010 | Crews et al. |
| 2012/0015852 | A1 * | 1/2012 | Quintero ................. C09K 8/32 |
| | | | 507/119 |
| 2012/0052038 | A1 | 3/2012 | Panandiker et al. |
| 2012/0211227 | A1 * | 8/2012 | Thaemlitz .............. C09K 8/516 |
| | | | 977/773 |
| 2013/0084643 | A1 | 4/2013 | Commarieu et al. |
| 2013/0165353 | A1 | 6/2013 | Mazyar et al. |
| 2013/0334100 | A1 | 12/2013 | Mazyar et al. |
| 2014/0005304 | A1 | 1/2014 | Suresh et al. |
| 2014/0027116 | A1 | 1/2014 | Suresh et al. |
| 2015/0144344 | A1 | 5/2015 | Mazyar et al. |
| 2015/0361773 | A1 | 12/2015 | Agrawal et al. |
| 2016/0017202 | A1 | 1/2016 | Yang et al. |
| 2016/0369157 | A1 | 12/2016 | Agrawal et al. |
| 2017/0088696 | A1 | 3/2017 | Dolog et al. |
| 2017/0137704 | A1 | 5/2017 | Mazyar et al. |
| 2017/0247599 | A1 | 8/2017 | Mazyar et al. |
| 2017/0327722 | A1 | 11/2017 | Li et al. |
| 2017/0349461 | A1 | 12/2017 | Kuznetsov et al. |
| 2017/0361376 | A1 | 12/2017 | Murugesan et al. |
| 2018/0044580 | A1 | 2/2018 | Mazyar et al. |
| 2018/0044595 | A1 | 2/2018 | Mazyar et al. |
| 2018/0194947 | A1 | 7/2018 | Lortz et al. |
| 2018/0312741 | A1 | 11/2018 | Lortz et al. |
| 2018/0327652 | A1 * | 11/2018 | Kuznetsov ............. E21B 43/24 |
| 2019/0010382 | A1 * | 1/2019 | Kuznetsov ............. C09K 8/584 |
| 2019/0106328 | A1 | 4/2019 | Lortz et al. |
| 2019/0127587 | A1 | 5/2019 | Lortz et al. |
| 2019/0299184 | A1 * | 10/2019 | Suresh ..................... C09K 8/58 |
| 2020/0406217 | A1 | 12/2020 | Suresh et al. |
| 2021/0147743 | A1 * | 5/2021 | Suresh ................... E21B 43/16 |
| 2022/0010198 | A1 * | 1/2022 | Kuznetsov ............. C09K 8/594 |

OTHER PUBLICATIONS

Bagaria et al., Adsorption of Iron Oxide Nanoclusters Stabilized with Sulfonated Copolymers on Silica in Concentrated NaCl and CaCl2 Brine, Journal of Colloid and Interface Science, vol. 398 (2013), pp. 217-226.
Bagaria et al., Iron Oxide Nanoparticles Grafted wit Sulfonated Copolymers are Stable in Concentrated Brine at Elevated Temperatures and Weakly Adsorb on Silica, Applied Materials and Interfaces, vol. 5, (2013), pp. 3329-3339.
International Search Report for International Application No. PCT/US2019/024680 dated Aug. 8, 2019, 5 pages.
International Written Opinion for International Application No. PCT/US2019/024680 dated Aug. 8, 2019, 6 pages.
Iqbal et al., High Temperature Stability and Low Adsorption of Sub-100 nm Magnitite Nanoparticles Grafted with Sulfonated Copolymers on Berea Sandstone in High Salinity Brine, Colloids and Sufaces A: Physicochem. Eng. Aspects, vol. 520, (2017), pp. 257-267.
Metin et al., Stability of Aqueous Silica Nanoparticle Dispersions, J. Nanopart Res., vol. 13, (2011), pp. 839-850.
Metin et al., Stability of Aqueous Silica Nanoparticle Dispersons under Subsurface Conditions, Clean Technology, Clean Technology (2010), www.ct-si.org, ISBN 978-1-4398-3419-0. 25, pp. 25-28.
Third Party Observation for International Application No. PCT/US2019/024680 dated Mar. 23, 2020, 4 pages.
Worthen et al., Steric Stabilization of Nanoparticles with Grafted Low Molecular Weight Ligands in Highly Concentrated Brines Including Divalent Ions, Soft Matter, vol. 12, (2016), pp. 2025-2039.
Xue et al., Effect of Grafted Copolymer Composition on Iron Oxide Nanoparticle Stability and Transport in Porous Media at High Salinity, Energy & Fuels, vol. 28, (2014), pp. 3655-3665.

* cited by examiner

COMPOSITIONS OF MATTER COMPRISING SUSPENDED NANOPARTICLES FUNCTIONALIZED WITH GLYMO OR GLYMO-LIKE GROUPS AND RELATED METHODS

TECHNICAL FIELD

Embodiments of the present disclosure relate generally to suspensions of nanoparticles and methods of forming and using suspensions.

BACKGROUND

"Nanoparticles," at least as that term is used herein, are generally defined as particles (e.g., solid particles) having a maximum outer dimension (e.g., an outer diameter) of less than 1 micron. Nanoparticles may be used in a variety of processes within the oil-and-gas industry, such as enhanced oil recovery, clay stabilization, drilling fluids, fracturing fluids, etc. Nanoparticles may also be used for products such as dyes and pigments, coatings, magnetic recording media, quantum dots, and semiconductors.

Nanoparticles may be used to form suspensions or colloids. There are certain challenges in forming and maintaining suspensions of nanoparticles. For example, particles tend to aggregate more quickly in liquids having higher ionic strengths, and aggregates tend to settle from the suspension.

Solid surfaces exposed to a liquid exhibit a structure referred to in the art as an "electrical double layer," in which two layers of oppositely charged particles (e.g., ions and electrons) cover the surface. In the case of nanoparticles, the layers may surround the nanoparticles. As the size of the nanoparticles decreases, the effect of the charged layers on the nanoparticles' stability in the liquid increases. Furthermore, the size of the electrical double layer decreases as the ionic strength of the liquid increases. A decrease in the electrical double layer corresponds to a decrease in repulsive forces between nanoparticles. Because repulsive forces generally limit the rate of aggregation of nanoparticles, large ionic strengths of the liquid therefore allow attractive van der Waals forces between nanoparticles to dominate their movement, and dispersions of nanoparticles in high-ionic-strength liquids tend to become unstable and form sediment (i.e., larger agglomerations of particles that fall from the suspension). With an increase in temperature, the kinetic energy of suspensions increases, which leads to more frequent and higher-energy particle collisions, which further disrupt the electrical double layer and cause nanoparticles to aggregate.

Colloidal nanoparticle suspension may generally be controlled through charge stabilization, steric stabilization, or a combination of both charge and steric stabilization. Colloidal stability of nanoparticles is important for certain applications in aqueous media containing concentrated electrolytes like biological fluids, sea water, high-brine concentrated injection fluids, etc. Many practical applications in biomedical, environmental, and oil and gas applications use high-ionic-strength liquids. In such applications, nanoparticle stability is crucial.

BRIEF SUMMARY

A composition of matter comprises a liquid and functionalized nanoparticles suspended in the liquid. At least some of the functionalized nanoparticles comprise nanoparticles of aluminosilica and have a chemical structure of:

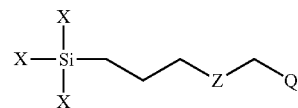

wherein at least one of the X's represents —O— bonded to a silicon (Si) atom or an aluminum (Al) atom of the aluminosilica of at least one of the nanoparticles; each other of the X's represents an additional —O— bonded to another silicon (Si) atom or another aluminum (Al) atom of the aluminosilica of at least one of the nanoparticles, an alkoxy group, an alkyl group, a hydroxyl group (OH), a hydrogen atom, or a halide; Z represents an oxygen (O) atom or an NH group; and Q represents an epoxide group, an aziridine group, a —CH(OH)CH$_2$OH group, a —CH(OH)CH$_2$NH$_2$ group, a —CH(NH)$_2$CH$_2$OH group, or a —CH(NH$_2$)CH$_2$NH$_2$ group.

A method for forming a suspension of functionalized nanoparticles comprises functionalizing nanoparticles with an organosilicon functional group to form functionalized nanoparticles. The nanoparticles each comprise silica and alumina. The functionalized nanoparticles have a chemical structure of:

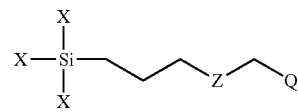

wherein at least one of the X's represents —O— bonded to a silicon (Si) atom or an aluminum (Al) atom of at least one of the nanoparticles; each other of the X's represents an additional —O— bonded to another silicon (Si) atom or another aluminum (Al) atom of at least one of the nanoparticles, an alkoxy group, an alkyl group, a hydroxyl group (OH), a hydrogen atom, or a halide; Z represents an oxygen (O) atom, or an NH group; and Q represents an epoxide group, an aziridine group, a —CH(OH)CH$_2$OH group, a —CH(OH)CH$_2$NH$_2$ group, a —CH(NH$_2$)CH$_2$OH group, or a —CH(NH$_2$)CH$_2$NH$_2$, group. The method also includes forming a suspension of the functionalized nanoparticles in a liquid.

A method of using a suspension comprises providing the composition of matter discussed above and injecting the composition of matter into a subterranean well.

DETAILED DESCRIPTION

Figure 1:
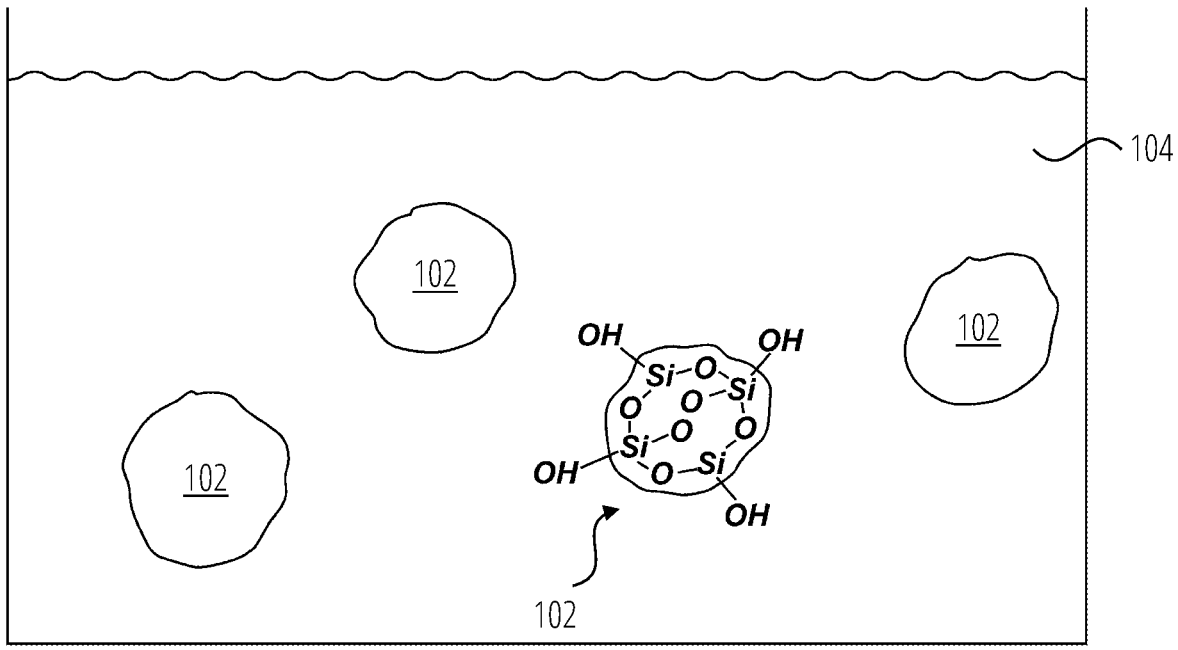
FIG. 1 is a simplified illustration of a suspension of silica nanoparticles in a liquid, in accordance with embodiments of the disclosure.

Compositions and methods, according to embodiments of the disclosure, include silica-and-alumina nanoparticles (i.e., "aluminosilica" nanoparticles, "aluminosilicate" nanoparticles) functionalized with organosilicon functional groups such as (3-glycidyloxypropyl)trimethoxysilane (also known as, and otherwise referred to herein as, "GLYMO"), with organosilicon functional groups derived from GLYMO, or with organosilicon functional groups with structures similar to GLYMO. In some embodiments, these organosilicon functional groups are hydrolyzed and/or have nitrogen (N) substituted for one or more oxygen (O) atoms of the functionalizing compound. The functional groups may chemically bind to silicon (Si) atoms of the silica portion of the nanoparticles, to aluminum (Al) atoms of the alumina portion of the nanoparticles, or any combination thereof. The functionalized nanoparticles are well suited for forming relatively stable suspensions in briny, acidic, and relatively higher-temperature environments. Accordingly, suspensions formed from these functionalized nanoparticles may inhibit nanoparticle aggregation and precipitation, providing substantially-stable suspensions at well above room temperature (e.g., at about 30° C. to about 90° C., the latter being relatively close to the boiling point of the suspending liquid) and in concentrated brine (e.g., seawater or other relatively-high salinity water). The suspensions may also exhibit relatively higher ionic strength. The suspensions may be conducive for use in enhanced oil recovery (EOR) processes, treatment of water in tailing ponds, control of fines in wellbore formation, chelation of metal cations, and high temperature drilling fluids, to name a few non-limiting examples.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "about" used in reference to a given parameter is inclusive of the stated value and has the meaning dictated by the context (e.g., it includes the degree of error associated with measurement of the given parameter).

The illustrations presented herein are not actual views of any particular particle or suspension, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, only those process acts and structures necessary to understand the embodiments of the disclosure are described in detail below. Additional conventional acts and structures may be used. Also note, the drawings accompanying the application are for illustrative purposes only, and are not drawn to scale. Additionally, elements common between figures may have corresponding numerical designations.

The suspensions described herein include nanoparticles comprising alumina and silica. Such aluminosilica nanoparticles may be derived from silica nanoparticles. FIG. 1 illustrates nanoparticles of silica (also referred to herein as "silica nanoparticles" 102) from which the aluminosilica nanoparticles may be derived.

The silica nanoparticles 102 may be suspended in a liquid 104. The liquid 104 may include an aqueous medium comprising water and at least one other component. For example, the liquid 104 may include a mixture of ethanol and water, one or more salts dissolved in water, etc. In some embodiments, the liquid 104 may be an aqueous brine, such as seawater. The liquid 104 may have dissolved divalent or other multivalent ions therein, such as $Mg^{2+}$, $Ca^{2+}$, $Sr^{2+}$, $Ba^{2+}$, $Fe^{2+}$, $Fe^{2+}$, $Cu^{2+}$, $CO_3^{2+}$, $SO_3^{2+}$, $SO_4^{2-}$, $S^{2-}$, $PO_4^{3-}$, etc. For example, the liquid may have at least about 10 parts per thousand (ppt) of dissolved salts, at least about 20 ppt of dissolved salts, or even at least about 30 ppt of dissolved salts. In certain embodiments, the liquid 104 may include an alcohol (e.g., glycol (e.g., ethylene glycol)) or one or more solvents, such as tetrahydrofuran, dimethylformamide, dimethyl sulfoxide, propylcarbonate, acetone, acetate, toluene, alcohol(s), ether(s), ester(s), etc., or combinations of any of the foregoing.

Hydroxyl (—OH) groups may be attracted, by van der Waals, to silicon (Si) atoms at the surfaces of the silica nanoparticles 102, forming silanol (Si—OH) functional groups on the surfaces of the silica nanoparticles 102.

Figure 2:
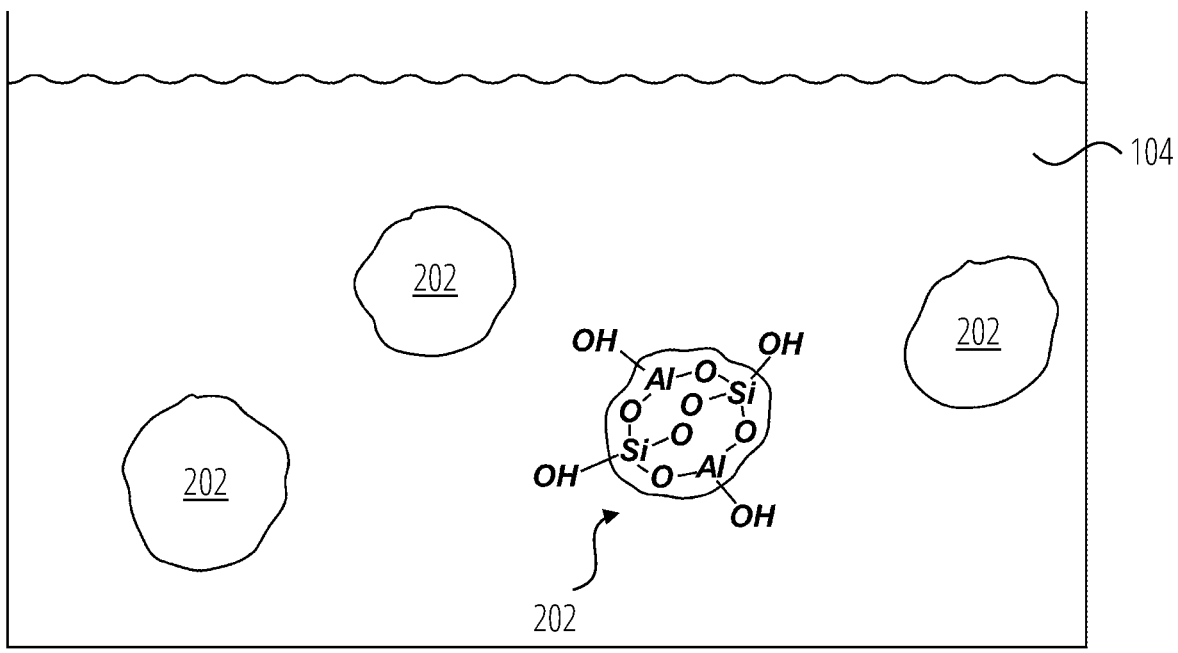
FIG. 2 is a simplified illustration of a suspension of nanoparticles of silica and alumina in a liquid, in accordance with embodiments of the disclosure.

The exposed surface of the silica nanoparticles 102 may be modified to substitute at least some silicon atoms with aluminum, forming aluminosilica nanoparticles 202, illustrated in FIG. 2. The surfaces of the aluminosilica nanoparticles 202 may include both Si—OH and Al—OH groups. Al—OH groups are more basic compared to Si—OH groups. By substituting aluminum atoms for at least some of the silicon atoms of the silica nanoparticles 102 (FIG. 1), the resulting aluminosilica nanoparticles 202 may be generally more chemically stable than the silica nanoparticles 102 of FIG. 1.

Figure 3:
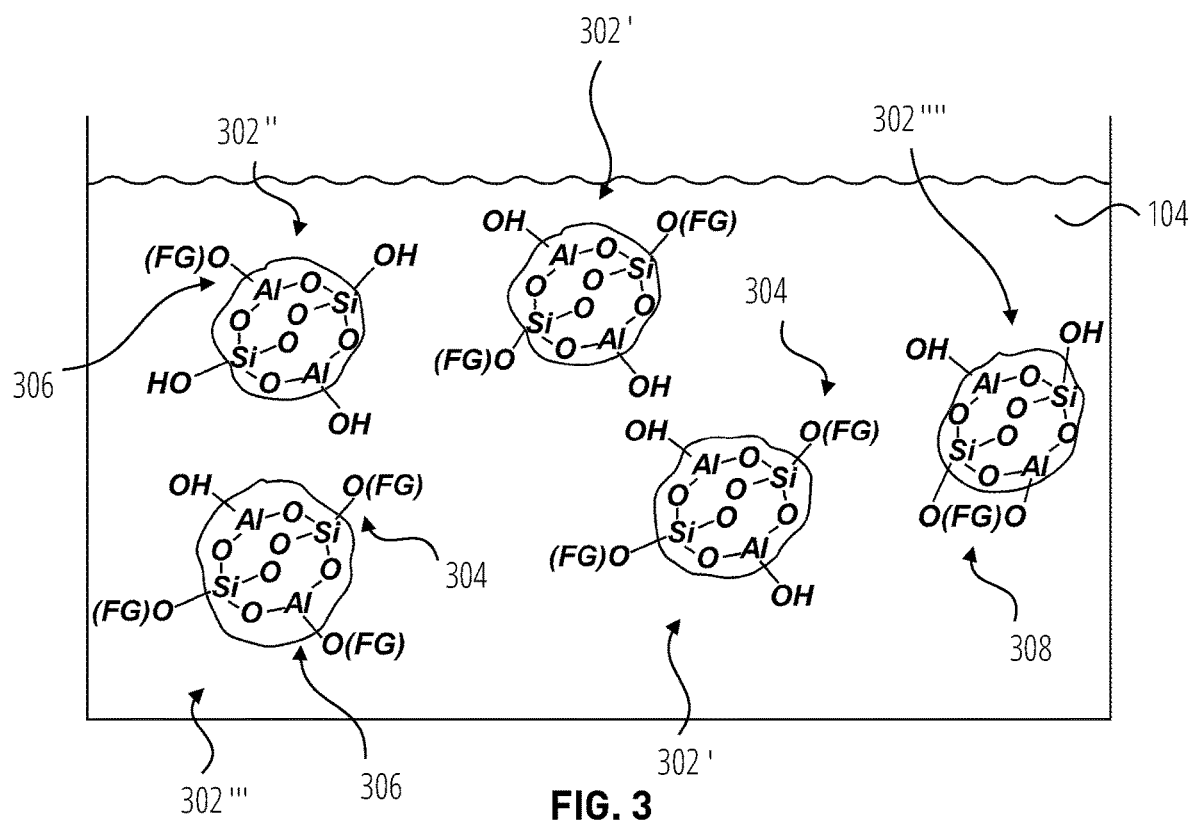
FIG. 3 is a simplified illustration of a suspension of functionalized nanoparticles of silica and alumina in a liquid, in accordance with embodiments of the disclosure.

The aluminosilica nanoparticles 202 may be functionalized—to form functionalized nanoparticles 302 illustrated in FIG. 3—by chemically bonding a organosilicon functional group (herein referred to as "(FG)" or "FG") to silicon atoms (as in the illustrated functionalized nanoparticles 302'), to aluminum atoms (as in the illustrated functionalized nanoparticles 302"), or to both silicon and aluminum atoms (as in the illustrated functionalized nanoparticles 302''' and 302'''') from the aluminosilica nanoparticles 202 (FIG. 2). Accordingly, one or more functionalized nanoparticles 302 may include at least one organosilicon functional group chemically bonded to silica of—or, in other words, to at least one silicon atom of—at least one aluminosilica nanoparticle 202 (FIG. 2), such as the bonded group indicated by arrows 304 for functionalized nanoparticles 302'. One or more functionalized nanoparticles 302 may include at least one organosilicon functional group chemically bonded to alumina of—or, in other words, to at least one aluminum atom of—at least one aluminosilica nanoparticle 202 (FIG. 2), such as the bonded group indicated by arrows 306 for functionalized nanoparticle 302" and 302'''. One or more functionalized nanoparticles 302 may include at least one organosilicon functional group chemically bonded to alumina and at least one other organosilicon function group chemically bonded to silica, such as the bonded groups indicated by arrows 306 and 304, respectively, of the functionalized nanoparticle 302''' illustrated in FIG. 3.

As discussed further below, an organosilicon functional group may include more than one bonding site that may chemically bond to the silica or alumina of an aluminosilica nanoparticle 202 (FIG. 2) (e.g., of a single aluminosilica nanoparticle 202). Accordingly, one or more organosilicon functional groups may be chemically bonded to more than one site of a functionalized nanoparticle 302, such as to more than one silicon atom of a single functionalized nanoparticle 302, to more than one aluminum atom of a single functionalized nanoparticle 302, or to at least one silicon atom and at least one aluminum atom of a single functionalized nanoparticle 302 (e.g., such as indicated by arrow 308 of the functionalized nanoparticle 302'''' of FIG. 3) Alternatively or additionally, one or more organosilicon functional groups may chemically bond to one or more other organosilicon functional groups and/or to itself.

Cross-linking between organosilicon functional groups and multiple nanoparticles may be substantially avoided. That is, the suspension may be substantially free of organosilicon functional groups bonded to multiple nanoparticles. To substantially avoid such multiple-nanoparticle cross-linking, the amount (e.g., concentration) of nanoparticles (e.g., silica nanoparticles 102 (FIG. 1) and/or aluminosilica nanoparticles 202 (FIG. 2)) may be maintained to be relatively low within the liquid 104. For example, in some embodiments, the suspension may include less than about 10% (e.g., less than about 10 weight percent (wt. %), less than about 10 volume percent (vol. %)) nanoparticles in the liquid 104 (e.g., less than about 5 wt. % or less than about 5 vol. % nanoparticles in the liquid 104). At such relatively small concentrations of the nanoparticles (e.g., the silica nanoparticles 102 (FIG. 1), the aluminosilica nanoparticles 202 (FIG. 2)), the nanoparticles may not be in relatively close proximity to one another during the functionalization.

Functionalizing the nanoparticles (e.g., the aluminosilica nanoparticles 202 (FIG. 2)) to form functionalized nanoparticles 302 with substantially the same organosilicon functional groups may improve interactions between the functionalized nanoparticles 302 and the liquid 104 and may inhibit the functionalized nanoparticles 302 from aggregating directly with one another and precipitating out of suspension.

Figure 4A:
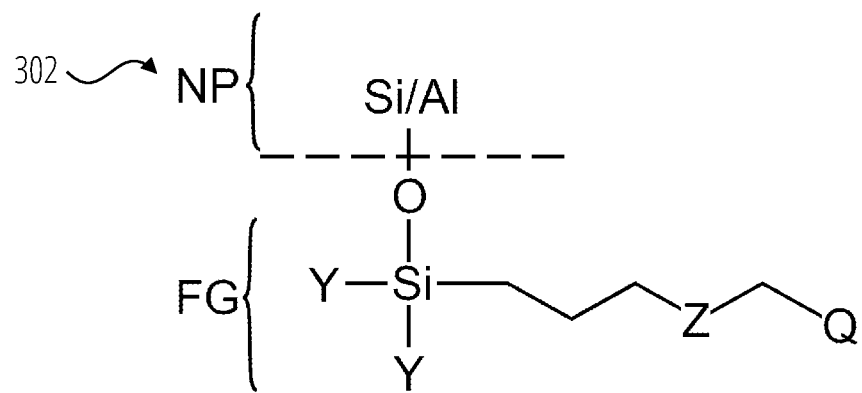
FIG. 4A is a schematic diagram of an organosilicon functional group bonded—via an alkoxy group at a first bonding site of a silicon atom of the organosilicon functional group—to a silicon or aluminum atom of a nanoparticle, in accordance with embodiments of the disclosure.
Figure 4B:
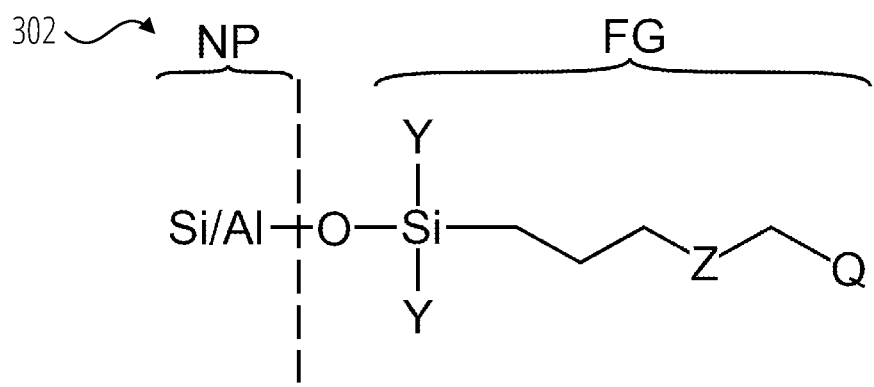
FIG. 4B is a schematic diagram of an organosilicon functional group bonded—via an alkoxy group at a second bonding site of a silicon atom of the organosilicon functional group—to a silicon or aluminum atom of a nanoparticle, in accordance with embodiments of the disclosure.
Figure 4C:
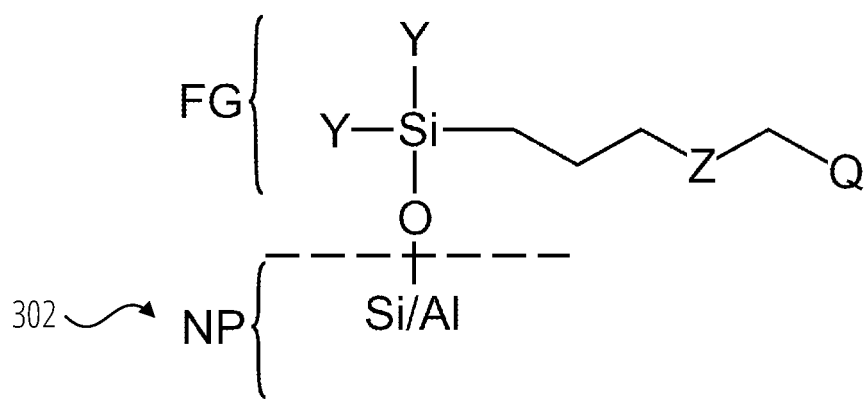
FIG. 4C is a schematic diagram of an organosilicon functional group bonded—via an alkoxy group at a third bonding site of a silicon atom of the organosilicon functional group—to a silicon or aluminum atom of a nanoparticle, in accordance with embodiments of the disclosure.

With reference to FIG. 4A through FIG. 4C, the organosilicon functional group (FG), which is bonded to the silicon and/or aluminum atom (Si/Al) of the nanoparticle (NP), has at least one silicon atom and at least one organic moiety connected by an Si—C bond. The organosilicon functional group FG may provide steric stabilization to the functionalized nanoparticles 302 and may make the functionalized nanoparticles 302 relatively more physically stable in a suspension of the liquid 104. Other components illustrated in FIG. 4A through FIG. 4C (e.g., the "Y," "Z," and "Q") are described below.

Organosilicon Functional Groups FG of the Functionalized Nanoparticles:

The organosilicon functional group FG of the functionalized nanoparticle 302 may have a chemical structure of "Structure I," as follows:

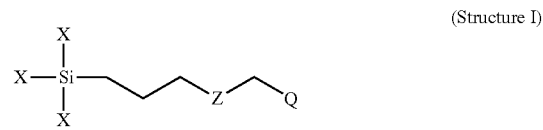

(Structure I)

wherein:
each "X" represents a potential bonding site between the silicon (Si) of the organosilicon functional group FG and the nanoparticle NP via an intermediate oxygen atom (—O—), or between the silicon (Si) of the organosilicon functional group FG and another atom or atomic group, such that each "X" more particularly represents:
a silicon (Si) atom or an aluminum (Al) atom of the nanoparticle NP (e.g., from the aluminosilica nanoparticle 202) bonded to the organosilicon functional group FG via an oxygen atom (—O—);
an alkoxy group (—O—R);
an alkyl group (—R) (e.g., $CH_3$);
a hydroxyl group (—OH);
a hydrogen atom (—H); or
a halide (e.g., —Cl, —F, —Br, —I);
the "Z" represents:
an oxygen (O) atom; or
an NH group; and
the "Q" represents:
an epoxide group,
an aziridine group,
a —CH(OH)$CH_2$OH group,
a —CH(OH)$CH_2NH_2$ group,
a —CH($NH_2$)$CH_2$OH group, or
a —CH($NH_2$)$CH_2NH_2$, group.

In embodiments in which Q represents an epoxide group or an aziridine group, the organosilicon functional group FG may be referred to herein as "non-hydrolyzed." In embodiments in which Q represents the —CH(OH)$CH_2$OH group, the —CH(OH)$CH_2NH_2$ group, the —CH($NH_2$)$CH_2$OH group, or the —CH($NH_2$)$CH_2NH_2$ group, the organosilicon functional group may be referred to herein as "hydrolyzed."

As an example implementing Structure I, in some embodiments one or more of the organosilicon functional group(s) FP of the functionalized nanoparticle(s) 302 includes either the epoxide group (non-hydrolyzed) or the aziridine group (non-hydrolyzed) and so has a non-hydrolyzed chemical structure of "Structure II," as follows:

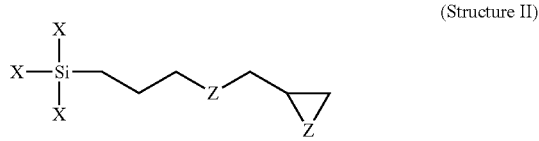
(Structure II)

As a more particular example, in some embodiments, Z represents the oxygen atom for at least some of the organosilicon function group(s), such that these organosilicon functional group(s) have a chemical structure of "Structure III," as follows:

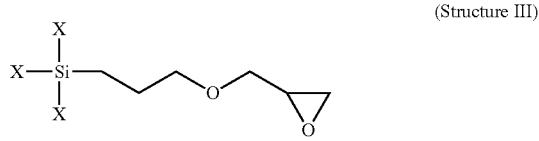
(Structure III)

In other embodiments, one or more of the oxygen (O) atoms shown in Structure III may be substituted with a nitrogen-including group (e.g., NH).

With reference to FIG. 4A, FIG. 4B, and FIG. 4C, schematically illustrated are organosilicon functional groups (FG) chemically bonded to the silicon or aluminum atom(s) (Si/Al) of the nanoparticle NP (the aluminosilica nanoparticle 202 (FIG. 2)) to provide functionalized nanoparticles 302 (FIG. 3). In these and other drawings and chemical structures herein, and as discussed further below, "Y" represents an alkoxy group (—O—R), an alkyl group (—R) (e.g., CH₃), a hydroxyl group (—OH), a hydrogen atom (—H), or a halide (e.g., —Cl, —F, —Br, —I).

In the functionalized nanoparticle 302, the chemical bond between the organosilicon functional group (FG) (e.g., with a chemical structure according to Structure I, e.g., Structure II, e.g., Structure III) and the silicon or aluminum atom(s) (Si/Al) of the nanoparticle NP (the aluminosilica nanoparticle 202 (FIG. 2)) is via an oxygen atom (O) also chemically bonded to a silicon (Si) atom of the organosilicon functional group (FG). The connecting oxygen (O) atom may be derived from an alkoxy group of the organosilicon functional group or from a hydroxyl group of the aluminosilica nanoparticle 202 (FIG. 2).

Without being bound to any particular theory, it appears that the connecting oxygen atom (—O—), of the intermediate alkoxy group, aids in the formation of a covalent bond to the silicon or aluminum (Si/Al) atoms at the surface of the aluminosilica nanoparticle 202 (FIG. 2) (also referred to herein as the nanoparticle "NP" of the functionalized nanoparticle 302 (FIG. 3)).

The organosilicon functional group FG may be hydrophilic, which may improve the suspension of the functionalized nanoparticles 302 in the liquid 104 (e.g., water, salt water, seawater, brine).

Each functionalized nanoparticle 302 may include one or more organosilicon functional groups FG bonded thereto. The degree of stability of the functionalized nanoparticles 302 may increase with an increasing number of bonded organosilicon functional groups FG.

The silicon (Si) atom(s) of the organosilicon functional group FG may include up to three available bonding sites (e.g., three bonding sites not bound to the organic chain of the organosilicon functional group, which three bonding sites correspond to the "X"s illustrated in the chemical structures herein and the illustrations of the drawings). For each functionalized nanoparticle 302, the nanoparticle NP may be chemically bonded, via an oxygen atom, at any one or more of the three bonding sites (e.g., at a first bonding site, as illustrated in FIG. 4A; at a second bonding site, as illustrated in FIG. 4B; or at a third bonding site, as illustrated in FIG. 4C).

In the figures and chemical structures herein, "Y" represents a potential bonding site at which the silicon (Si) atom of the organosilicon functional group FG is not chemically bonded to the nanoparticle NP. Accordingly, as mentioned above, "Y" represents:
an alkoxy group (—O—R);
an alkyl group (—R) (e.g., CH₃);
a hydroxyl group (—OH);
a hydrogen atom (—H); or
a halide (e.g., —Cl, —F, —Br, —I).

Each "Y" may correspond to a potential bonding site for joining the organosilicon functional group FG to a silicon or aluminum (Si/Al) atom of an aluminosilica nanoparticle NP, which potential may or may not be subsequently realized in the suspension.

Figure 5:
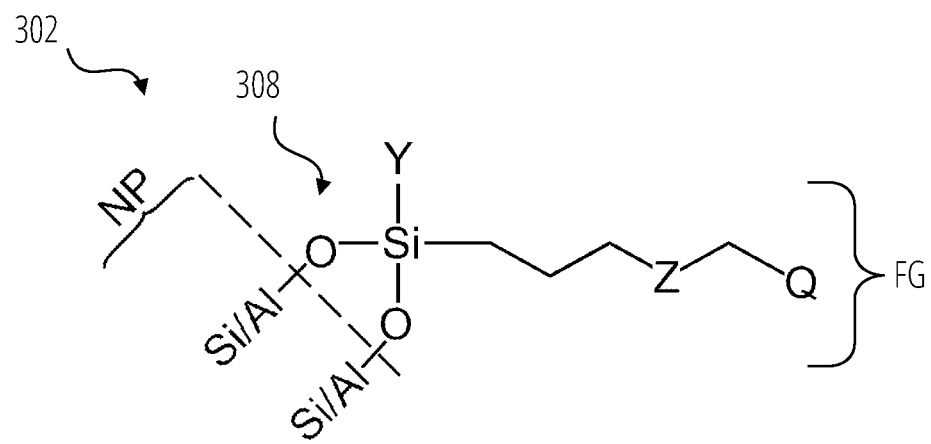
FIG. 5 is a schematic diagram of an organosilicon functional group bonded—via alkoxy groups—to multiple silicon or aluminum atoms of a single nanoparticle, in accordance with embodiments of the disclosure.

While FIGS. 4A, 4B, and 4C illustrate functionalized nanoparticles 302 with a single organosilicon functional group FG bonded to a single aluminosilica nanoparticle NP, the disclosure is not so limited. In other embodiments, one or more functionalized nanoparticles 302 of a suspension may include a single organosilicon functional group FG bonded to multiple silicon or aluminum (Si/Al) atoms of a single aluminosilica nanoparticle NP, as illustrated in FIG. 5.

Functionalizing Compounds (FC):

The organosilicon functional groups FG are derived from functionalizing compounds "FC," any of which may have a chemical structure according to "Structure IV," as follows:

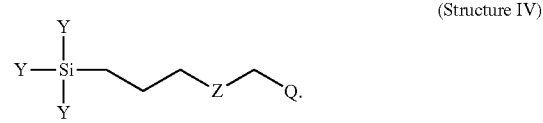
(Structure IV)

For example, in some embodiments, the functionalizing compound(s) FC may be non-hydrolyzed, Z may represent oxygen, and Q may represent an epoxide group, such that one or more of the functionalizing compound(s) may have a chemical structure according to "Structure V," as follows:

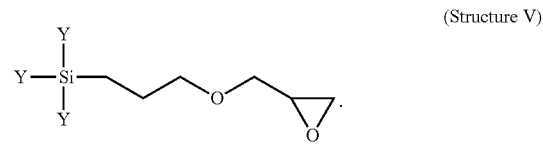
(Structure V)

In some embodiments in which the functionalizing compound(s) FC implement Structure V, Y may represent an alkoxy-bonded alky group, such that one or more of the functionalizing compound(s) may have a chemical structure according to "Structure VI," as follows:

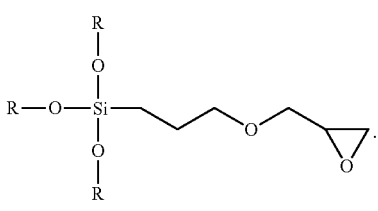
(Structure VI)

In some embodiments in which the functionalizing compound(s) FC implement Structure VI, the alkyl group(s) (R) may represent methyl groups (—CH₃), such that one or more of the functionalizing compound(s) may have the chemical structure according to "Structure VII," as follows, such that the functionalizing compound(s) is(are) GLYMO (i.e., (3-glycidyloxypropyl)trimethoxysilane):

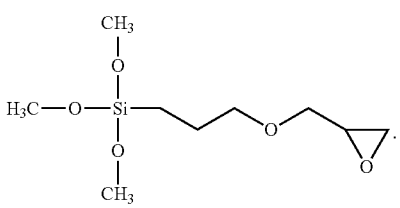
(Structure VII)

Functionalizing compounds FC with Structures V, VI, and VII may be referred to herein as "non-hydrolyzed" functionalizing compounds.

In some embodiments, one or more of the oxygen (O) atoms—of the organic chain that is bound to the silicon (Si) of the functionalizing compound FC—may be substituted with a nitrogen group (e.g., NH). Accordingly, in some embodiments, one or more of the functionalizing compounds may have a chemical structure according to "Structure VIII" (a single nitrogen substitution such that the FC comprises an —N— linkage in the organic chain that includes the epoxide group), a chemical structure according to "Structure IX" (a single nitrogen substitution such that the FC comprises an —O— linkage in the organic chain that includes an aziridine group), or a chemical structure according to "Structure X" (a double nitrogen substitution such that the FC comprises an —N— linkage in the organic chain that includes an aziridine group), as follows:

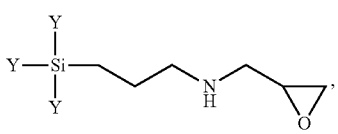
(Structure VIII)

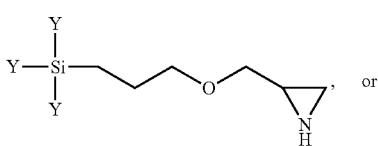
(Structure IX) or

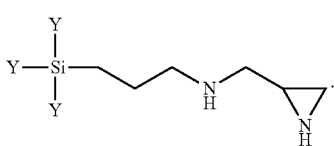
(Structure X)

In some embodiments, one or more of the functionalizing compounds FC may be hydrolyzed and may or may not include a nitrogen substitution.

In some such embodiments, a hydrolyzed functionalizing compound FC, not including a nitrogen substitution, may have a chemical structure according to "Structure X," as follows, wherein the Z of Structure IV represents an oxygen (O) atom, and the Q of Structure IV represents a —CH(OH)CH₂OH group:

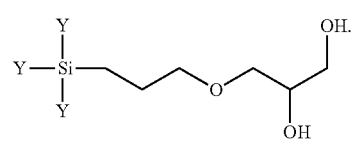
(Structure XI)

In accordance with Structure XI, in some embodiments, Y represents an alkoxy-bonded alkyl group, such that the functionalizing compound(s) FC may have a chemical structure according to "Structure XII," as follows:

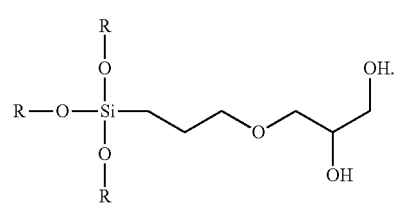
(Structure XII)

In accordance with Structures XI and XII, in some embodiments, the alkyl group (R) represents a methyl group (CH₃), such that the functionalizing compound(s) FC may have a chemical structure according to "Structure XIII," as follows, and so may be characterized as "hydrolyzed GLYMO":

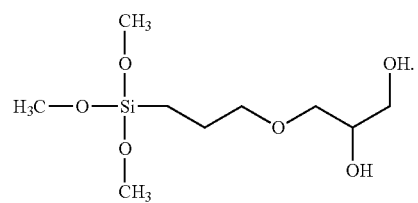
(Structure XIII)

In some embodiments in which the functionalizing compound(s) FC are hydrolyzed, one or more of the oxygen (O) atoms—of the organic chain that is bound to the silicon (Si) of the functionalizing compound FC—may be substituted with a nitrogen group (e.g., NH). Accordingly, in some embodiments, one or more of the functionalizing compounds may have a chemical structure according to:

"Structure XIV," as follows, including a single nitrogen substitution at a first oxygen position, e.g., at the end of the organic chain, and wherein the Z of Structure IV represents an oxygen (O) atom, and the Q of Structure IV represents a —CH(OH)CH₂NH₂ group:

(Structure XIV)

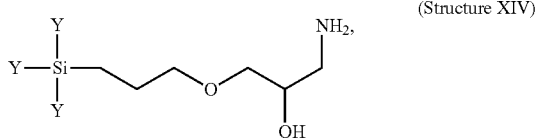

"Structure XV," as follows, including a single nitrogen substitution at a second oxygen position, wherein the Z of Structure IV represents an oxygen (O) atom, and the Q of Structure IV represents a —CH(NH$_2$)CH$_2$OH group:

(Structure XV)

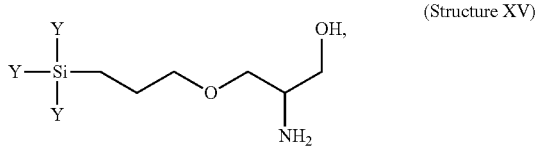

"Structure XVI," as follows, including a single nitrogen substitution at a third oxygen position, wherein the Z of Structure IV represents an NH group, and the Q of Structure IV represents a —CH(OH)CH$_2$OH group:

(Structure XVI)

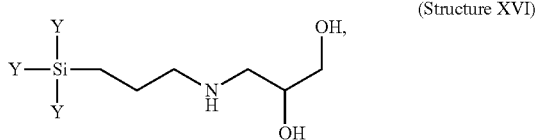

"Structure XVII," as follows, including two nitrogen substitutions at the first and second oxygen positions, wherein the Z of Structure IV represents an oxygen (O) atom, and the Q of Structure IV represents a —CH(NH$_2$)CH$_2$NH$_2$, group:

(Structure XVII)

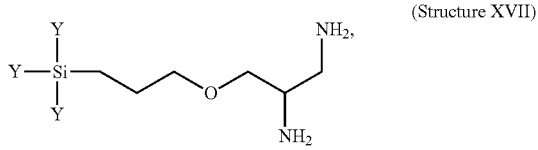

"Structure XVIII," as follows, including two nitrogen substitutions at the first and third oxygen positions, wherein the Z of Structure IV represents an NH group, and the Q of Structure IV represents a —CH(OH)CH$_2$NH$_2$ group:

(Structure XVIII)

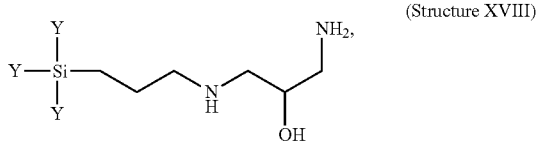

"Structure XIX," as follows, including two nitrogen substitutions at the second and third oxygen positions, wherein the Z of Structure IV represents an NH group, and the Q of Structure IV represents a —CH(NH$_2$)CH$_2$OH group:

(Structure XIX)

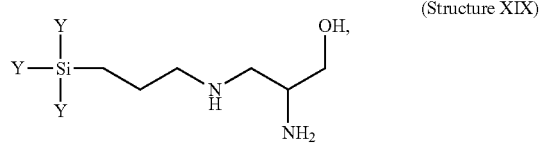

or

"Structure XX," as follows, including three nitrogen substitutions at the first, second, and third oxygen positions, wherein the Z of Structure IV represents an NH group, and the Q of Structure IV represents a —CH(NH$_2$)CH$_2$NH$_2$, group:

(Structure XX)

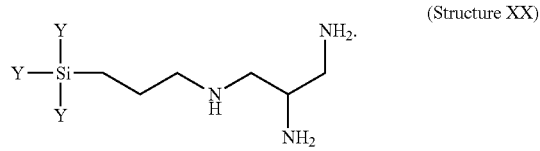

Each of the functionalizing compounds FC (of any of Structures IV through XX) may alternatively be referred to herein as "GLYMO" or "GLYMO-like" compounds, and the organosilicon functional group(s) derived therefrom may also be referred to herein as "GLYMO" or "GLYMO-like" groups.

The functionalizing compounds FC (of the Structures IV through XX) may be compounds commercially available or otherwise may be synthesized, using conventional methods, to exhibit the Structures IV through XX.

Functionalizing the Aluminosilica Nanoparticles:

To bond the organosilicon functional group FG, derived from the functionalizing compound FC, with the silicon or aluminum (Si/Al) atoms at the surfaces of the aluminosilica nanoparticles 202 (FIG. 2) to form the functionalized nanoparticles 302 (FIG. 3), the functionalizing compound(s) FC may be added to the liquid 104 (FIG. 2). This mixture may be heated to a reaction temperature, though, in some embodiments, the reaction may proceed even without heating. For example, in embodiments in which the organosilicon functional group FG is a GLYMO functional group (i.e., the functionalizing compound FC is GLYMO (Structure XIII)) or a GLYMO-like functional group (e.g., the functionalizing compound FC is of any other Structure IV), the mixture may be heated to a temperature of at least about 50° C., at least about 60° C., or at least about 65° C., and the reaction rate may vary based on temperature. The organosilicon function group FG (from the functionalizing compound FC) may replace —OH group(s) that were bonded to the surface of the aluminosilica nanoparticles 202 (FIG. 2) to form the functionalized nanoparticles 302 (FIG. 3). In some embodiments, one or more of the at-surface silicon or aluminum (Si/Al) atoms may remain bonded to —OH group(s) while others are bonded to the organosilicon functional group(s) FG.

Accordingly, upon functionalizing the aluminosilica nanoparticles 202 (FIG. 2) with the functionalizing compound(s) FC of any of Structures IV-XX disclosed herein, at least one of the bonding sites of the silicon (Si)

atom of the functionalizing compound FC will be effectively replaced with an —O— bonded to either a silicon or aluminum (Si/Al) atom of the aluminosilica nanoparticle(s) 202 to form the functionalized nanoparticle(s) 302 (FIG. 3). Accordingly, one or more of the Y's of Structure V will become —O—Si/Al, one or more of the —O—R's of Structure VI will become —O—Si/Al, and one or more of the —O—CH$_3$'s of Structure VII will become —O—Si/Al (each being consistent with Structure I). Therefore, the Y's of any of Structures IV-XX as shown above may be substituted for X's to provide an organosilicon functional group FG of a functionalized nanoparticle 302 in accordance with Structure I above.

Figure 6:
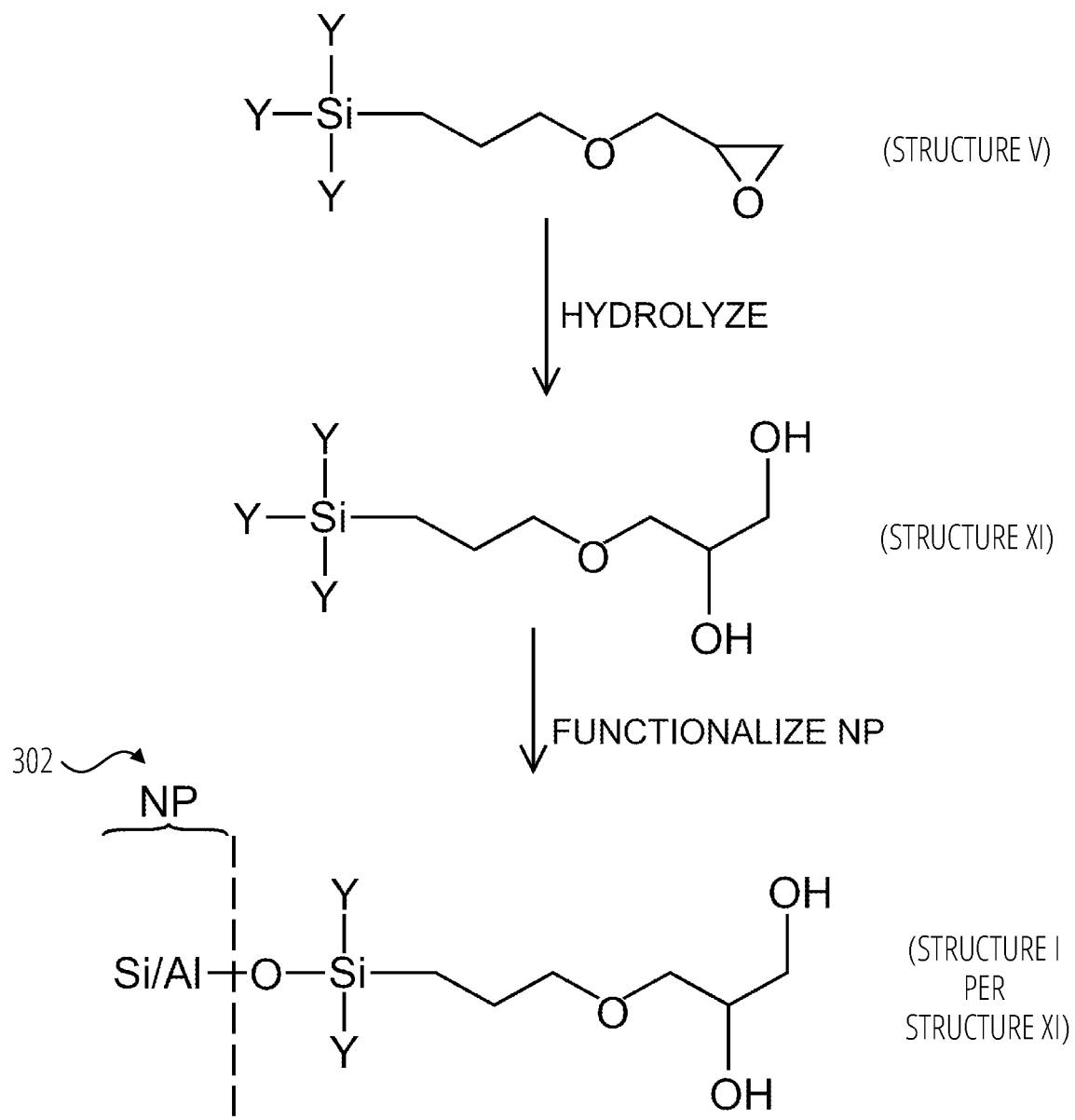
FIG. 6 is a schematic diagram charting a method for functionalizing a nanoparticle with a hydrolyzed organosilicon functional group, in accordance with embodiments of the disclosure, wherein the organosilicon functional group is hydrolyzed prior to bonding with the nanoparticle.

In embodiments in which the organosilicon functional group(s) FG of the functionalized nanoparticles 302 (FIG. 3) are hydrolyzed (e.g., wherein, in Structure I, Q represents a —CH(OH)CH$_2$OH group, a —CH(OH)CH$_2$NH$_2$ group, a —CH(NH$_2$)CH$_2$OH group, or a —CH(NH$_2$)CH$_2$NH$_2$, group), the functionalizing compound(s) FC may be hydrolyzed prior to bonding to the aluminosilica nanoparticles 202 (FIG. 2), as illustrated in FIG. 6. Alternatively, the functionalizing compound(s) FC may be hydrolyzed after bonding to the aluminosilica nanoparticles 202 (FIG. 2), as illustrated in FIG. 7.

Figure 7:
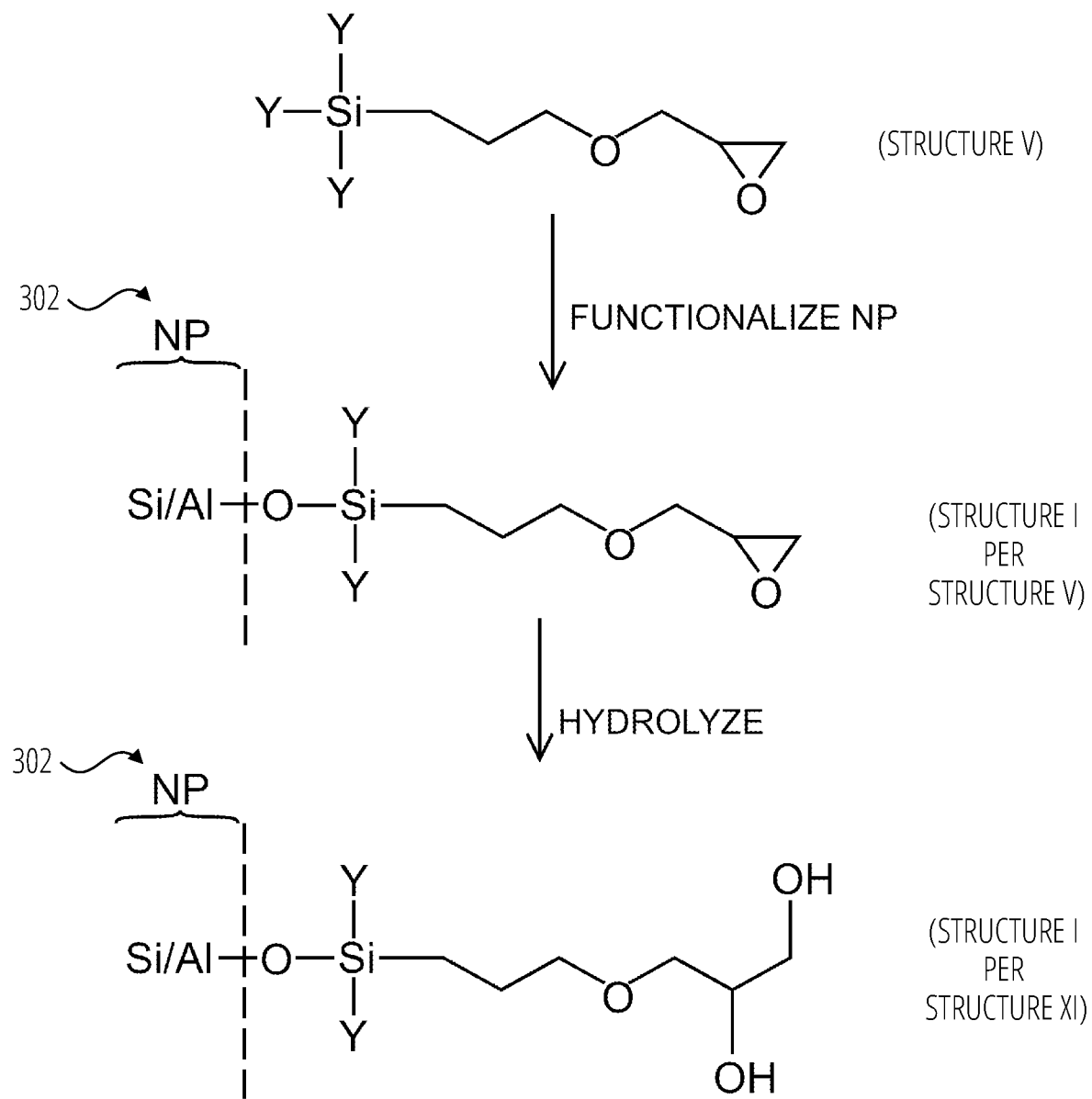
FIG. 7 is a schematic diagram charting a method for functionalizing a nanoparticle with a hydrolyzed organosilicon functional group, in accordance with embodiments of the disclosure, wherein the organosilicon functional group is hydrolyzed after bonding with the nanoparticle.

While FIG. 6 and FIG. 7 illustrate deriving the hydrolyzed functionalized nanoparticle 302 with Structure XI from the functionalizing compound FC of Structure V, via hydrolysis of the epoxy group of the functionalizing compound FC of Structure V, the disclosure is not limited to such methods for providing a hydrolyzed functionalized nanoparticle 302. For example, in other embodiments in which the organosilicon functional group(s) FG of the functionalizing nanoparticles 302 (FIG. 3) are hydrolyzed, the hydrolyzed portion of the functionalizing compound FC (e.g., of any of Structures XI-XIII or of any of the structures that further include N-substitutions, e.g., any of Structures XIV-XX), and/or of the resulting functionalized nanoparticle 302, may be obtained by other synthetic routes than hydrolysis of an epoxy group (e.g., of a compound of Structure V), whether derived from a functionalizing compound FC of Structure V or another structure. In some embodiments, the functionalizing compound(s) FC, when provided for use in the suspension-forming method, may be provided in already-hydrolyzed form (e.g., with any of Structures XI-XIII) or in an already-hydrolyzed and N-substituted form (e.g., with any of Structures XIV-XX).

Once functionalized, the functionalized nanoparticles 302 (FIG. 3) may be substantially stable in suspension in the liquid 104.

In some embodiments, the liquid 104 may be aqueous (e.g., water, salt water, brine, seawater). In these embodiments, the functionalizing compounds FC used to functionalize the aluminosilica nanoparticles 202 (FIG. 2) may be selected or otherwise formulated with Structure IV in which Y represents an alkoxy group (—O—R); an alkyl group (—R) (e.g., CH$_3$); a hydroxyl group (—OH); a hydrogen atom (—H); or a halide (e.g., —Cl, —F, —Br, —I); wherein not all of the Y's of the compound represent the alkyl group. That is, at least one of the Y's represents an alkoxy group (—O—R), a hydroxyl group (—OH), a hydrogen atom (—H), or a halide (e.g., —Cl, —F, —Br, —I). The Y's of a functionalizing compound FC may not all represent an alkyl group simultaneously.

In some embodiments, the liquid may be non-aqueous (e.g., glycol, tetrahydrofuran, dimethylformamide, dimethyl sulfoxide, propylcarbonate, acetone, acetate, toluene, alcohol, ether, ester, hydrocarbon, alkane, aromatic solvent, crude oil, and/or any combination of any of the foregoing). In these embodiments, the functionalizing compounds FC used to functionalize the aluminosilica nanoparticles 202 (FIG. 2) may be selected or otherwise formulated with Structure IV in which one or more Y represents a halide (e.g., —Cl, —F, —Br, —I). In some embodiments, each Y may represent a halide. In other embodiments, fewer than all Y's may represent a halide, and the non-halide Y(s) may represent an alkoxy group (—O—R); an alkyl group (—R) (e.g., CH$_3$); a hydroxyl group (—OH); or a hydrogen atom (—H).

Suspensions of the functionalized nanoparticles 302 may exhibit increased stability compared to suspensions of non-functionalized nanoparticles (e.g., the aluminosilica nanoparticles 202 of FIG. 2, the silica nanoparticles 102 of FIG. 1). For example, at least 50%, at least 75%, or even at least 90% of the functionalized nanoparticles 302 may remain in suspension in the liquid 104 when the suspension is maintained at a temperature of 30° C. for 30 days. At least 50%, at least 75%, or even at least 90% of the functionalized nanoparticles 302 may remain in suspension in the liquid 104 when the suspension is maintained at a temperature of 70° C. for 10 days. At least 50%, at least 75%, or even at least 90% of the functionalized nanoparticles 302 may remain in suspension in the liquid 104 when the suspension is maintained at a temperature of 90° C. for 24 hours. In comparison, a majority of non-functionalized nanoparticles (e.g., the aluminosilica nanoparticles 202 of FIG. 2, the silica nanoparticles 102 of FIG. 1) may precipitate out of the liquid 104 when the suspension thereof is maintained at the same temperatures for the same time periods.

Furthermore, because the functionalized nanoparticles 302 have fewer Si—OH bonds (compared to the silica nanoparticles 102 of FIG. 1 and the aluminosilica nanoparticles 202 of FIG. 2) and/or Al—OH bonds (compared to the aluminosilica nanoparticles 202 of FIG. 2), dehydration may be decreased with respect to conventional nanoparticles. This may increase the chemical stability of the functionalized nanoparticles 302, increasing the time period before the functionalized nanoparticles 302 degrade at a selected temperature. This effect may be particularly important in liquids 104 having high ionic strength (e.g., salt water, brine, seawater). For example, liquids 104 with divalent ions may tend to readily dehydrate Si—OH bonds, but may not react with silica atoms or aluminum atoms functionalized with the organosilicon functional groups FG as quickly.

It is also contemplated that the functionalized nanoparticles 302, which may have relatively bulky organosilicon functional groups, may prevent two more functionalized nanoparticles 302 from approaching one another closely enough to be permit cross-linking of multiple particles by a single multi-valent metal cation.

Without being bound by any particular theory, it appears that improved stability of the functionalized nanoparticles 302 in the liquid 104 may be associated with the neutralization of the overall charge of the core of the functionalized nanoparticles 302 (e.g., compared to silica nanoparticles 102 (FIG. 1)). Dissociation of acidic —SiOH groups with the release of protons leaves negatively charged sites on the aluminosilica nanoparticle 202 (FIG. 2), while the dissociation of —AlOH may result either in OH$^-$ or H$^+$ products. It appears that the primary dissociation route of —AlOH in the presence of —SiOH groups is the production of OH— groups, which tends to maintain the pH of the liquid 104. Remaining positive charges on aluminum atoms and negative charges on the outermost oxygen atoms attached to silicon atoms may tend to maintain the overall charge of the functionalized nanoparticles 302 near zero. Ions in the liquid 104 may either form alternating-charge shells ("+" near the negatively charged sites on the functionalized nanoparticles 302 and "−" near the positively charged sites on the functionalized nanoparticles 302) or not form the structured shells at all. Charge-neutral functionalized nanoparticles 302 may be less likely to interact with one another.

The presence of the functional groups FG may provide steric hindrance to further interactions, even if some of the functional groups FG become hydroxylated. Furthermore, functionalization of the functionalized nanoparticles 302 may decrease the number of silanol groups available for dehydration.

The suspension of the functionalized nanoparticles 302 may be used in a wide variety of applications. For example, the suspension may be injected into a subterranean well for enhanced oil recovery, clay stabilization, drilling fluids, fracturing fluids, etc., in the oil-and-gas industry. The suspension may also be used to form dyes and pigments, coatings, magnetic recording media, quantum dots, and semiconductors. In some embodiments, the suspension may be a biological fluid, such as blood or a component thereof.

Additional non-limiting example embodiments of the disclosure are described below.

Embodiment 1: A composition of matter, comprising: a liquid; and functionalized nanoparticles suspended in the liquid, at least some of the functionalized nanoparticles comprising nanoparticles of aluminosilica and having a chemical structure of:

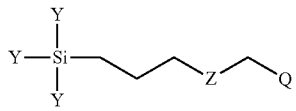

wherein: at least one of the X's represents —O— bonded to a silicon (Si) atom or an aluminum (Al) atom of the aluminosilica of at least one of the nanoparticles; each other of the X's represents: an additional —O— bonded to another silicon (Si) atom or another aluminum (Al) atom of the aluminosilica of at least one of the nanoparticles, an alkoxy group, an alkyl group, a hydroxyl group (OH), a hydrogen atom, or a halide; Z represents: an oxygen (O) atom, or an NH group; and Q represents: an epoxide group, an aziridine group, a —CH(OH)CH$_2$OH group, a —CH(OH)CH$_2$NH$_2$ group, a —CH(NH$_2$)CH$_2$OH group, or a —CH(NH$_2$)CH$_2$NH$_2$, group.

Embodiment 2: The composition of Embodiment 1, wherein the liquid is aqueous.

Embodiment 3: The composition of any one of Embodiments 1 and 2, wherein the liquid comprises salt.

Embodiment 4: The composition of any one of Embodiments 1 through 3, wherein at least one of the each other of the X's represents the halide.

Embodiment 5: The composition of Embodiment 1, wherein the liquid is non-aqueous; and at least one of the each other of the X's represents the halide.

Embodiment 6: The composition of any one of Embodiments 1 through 5, wherein the at least one of the X's represents the —O—bonded to the aluminum (Al) atom of the aluminosilica of the at least one of the nanoparticles.

Embodiment 7: The composition of any one of Embodiments 1 through 6, wherein at least one of the each other of the X's represents the additional —O— bonded to the another silicon (Si) atom or the another aluminum (Al) atom of the aluminosilica of the at least one of the nanoparticles.

Embodiment 8: The composition of any one of Embodiments 1 through 6, wherein: at least one of the each other of the X's represents the additional —O— bonded to the another silicon (Si) atom or the another aluminum (Al) atom; and the silicon (Si) atom or the aluminum (Al) atom represented by the at least one of the X's is of a same nanoparticle, of the at least one of the nanoparticles, as the another silicon (Si) atom or the another aluminum (Al) atom represented by the at least one other of the X's.

Embodiment 9: The composition of any one of Embodiments 1 through 8, wherein: the at least one of the X's represents the —O— bonded to the aluminum (Al) atom of the aluminosilica of the at least one of the nanoparticles; and at least one of the each other of the X's represents the additional —O— bonded to the another silicon (Si) atom of the aluminosilica of the at least one of the nanoparticles.

Embodiments 10: The composition of any one of Embodiments 1 through 9, wherein the at least some of the functionalized nanoparticles are hydrolyzed, wherein the Q represents:
  the —CH(OH)CH$_2$OH group,
  the —CH(OH)CH$_2$NH$_2$ group,
  the —CH(NH$_2$)CH$_2$OH group, or
  the —CH(NH$_2$)CH$_2$NH$_2$ group.

Embodiment 11: The composition of any one of Embodiments 1 through 9, wherein: the at least one of the X's represents the —O—bonded to the aluminum (Al) atom of the aluminosilica of the at least one of the nanoparticles; and the at least some of the functionalized nanoparticles are non-hydrolyzed, wherein the Q represents: an epoxide group, or an aziridine group.

Embodiment 12: The composition of any one of Embodiment 1 through 9, wherein the Q represents the aziridine group.

Embodiment 13: The composition of any one of Embodiments 1 through 12, wherein the Z represents the NH group.

Embodiment 14: A method for forming a suspension of functionalized nanoparticles, the method comprising: functionalizing nanoparticles with an organosilicon functional group to form functionalized nanoparticles, the nanoparticles each comprising silica and alumina, the functionalized nanoparticles having a chemical structure of:

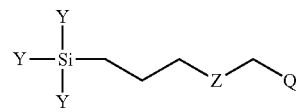

wherein: at least one of the X's represents —O— bonded to a silicon (Si) atom or an aluminum (Al) atom of at least one of the nanoparticles; each other of the X's represents: an additional —O— bonded to another silicon (Si) atom or another aluminum (Al) atom of at least one of the nanoparticles, an alkoxy group, an alkyl group, a hydroxyl group (OH), a hydrogen atom, or a halide; Z represents: an oxygen (O) atom, or an NH group; and Q represents: an epoxide group, an aziridine group, a —CH(OH)CH$_2$OH group, a —CH(OH)CH$_2$NH$_2$ group, a —CH(NH$_2$)CH$_2$OH group, or a —CH(NH$_2$)CH$_2$NH$_2$, group; and forming a suspension of the functionalized nanoparticles in a liquid.

Embodiment 15: The method of Embodiment 14, wherein functionalizing the nanoparticles with the organosilicon functional group comprises: hydrolyzing GLYMO; and bonding the hydrolyzed GLYMO to the nanoparticles to form the functionalized nanoparticles, wherein Z represents the oxygen (O) atom and Q represents the —CH(OH)CH$_2$OH group.

Embodiment 16: The method of Embodiment 14, wherein functionalizing the nanoparticles with the organosilicon functional group comprises: bonding GLYMO to the nanoparticles; and after the bonding, hydrolyzing the GLYMO to form the functionalized nanoparticles, wherein Z represents the oxygen (O) atom and Q represents the —CH(OH)CH$_2$OH group.

Embodiment 17: The method of any one of Embodiments 14 through 16, further comprising, before the functionalizing, modifying an exposed surface of silica nanoparticles to form the nanoparticles comprising the silica and the alumina.

Embodiment 18: The method of Embodiment 17, wherein modifying the exposed surface of the silica nanoparticles comprises replacing a silanol group with Al—OH.

Embodiment 19: The method of any one of Embodiments 14 through 18, further comprising maintaining the suspension at a temperature of at least 30° C. for a time period of at least 30 days while maintaining at least 90% of the functionalized nanoparticles in the suspension.

Embodiment 20: A method of using a suspension, comprising: providing the composition of matter of any one of Embodiments 1 through 13; and injecting the composition of matter into a subterranean well.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as claimed, including legal equivalents thereof. In addition, features from one embodiment may be combined with features of another embodiment while still being encompassed within the scope of the invention as contemplated by the inventors. Further, embodiments of the disclosure have utility with different and various processes and systems.

Claim 13, Column 19, Line 15, change "  " to 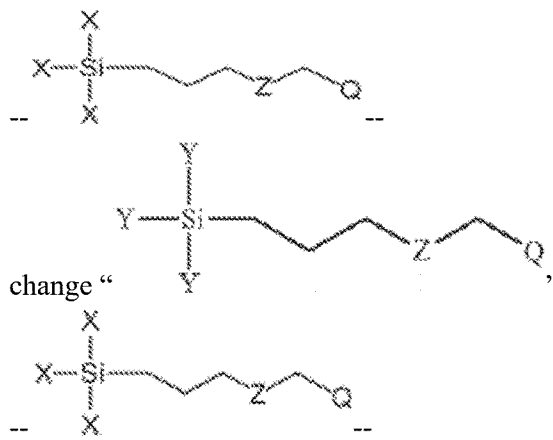

What is claimed is:

1. A composition of matter, comprising:
   a liquid; and
   functionalized nanoparticles suspended in the liquid, at least some of the functionalized nanoparticles comprising nanoparticles of aluminosilica and having a chemical structure of:

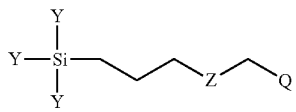

wherein:
   at least one of the X's represents —O— bonded to a silicon (Si) atom or an aluminum (Al) atom of the aluminosilica of at least one of the nanoparticles;
   each other of the X's represents:
   an additional —O— bonded to another silicon (Si) atom or another aluminum (Al) atom of the aluminosilica of at least one of the nanoparticles,
   an alkoxy group,
   an alkyl group,
   a hydroxyl group (OH),
   a hydrogen atom, or
   a halide; and
   either:
   Z represents an oxygen (O) atom, and Q represents:
   an aziridine group,
   a —CH(OH)CH$_2$OH group,
   a —CH(OH)CH$_2$NH$_2$ group,
   a —CH(NH$_2$)CH$_2$OH group, or
   a —CH(NH$_2$)CH$_2$NH$_2$ group; or
   Z represents an NH group, and Q represents:
   an epoxide group,
   an aziridine group,
   a —CH(OH)CH$_2$OH group,
   a —CH(OH)CH$_2$NH$_2$ group,
   a —CH(NH$_2$)CH$_2$OH group, or
   a —CH(NH$_2$)CH$_2$NH$_2$ group.

2. The composition of claim 1, wherein the liquid is aqueous.

3. The composition of claim 2, wherein the liquid comprises salt.

4. The composition of claim 1, wherein at least one of the each other of the X's represents the halide.

5. The composition of claim 4, wherein the liquid is non-aqueous.

6. The composition of claim 1, wherein the at least one of the X's represents the —O— bonded to the aluminum (Al) atom of the aluminosilica of the at least one of the nanoparticles.

7. The composition of claim 1, wherein at least one of the each other of the X's represents the additional —O— bonded to the another silicon (Si) atom or the another aluminum (Al) atom of the aluminosilica of the at least one of the nanoparticles.

8. The composition of claim 1, wherein:
at least one of the each other of the X's represents the additional —O— bonded to the another silicon (Si) atom or the another aluminum (Al) atom; and
the silicon (Si) atom or the aluminum (Al) atom represented by the at least one of the X's is of a same nanoparticle, of the at least one of the nanoparticles, as the another silicon (Si) atom or the another aluminum (Al) atom represented by the at least one other of the X's.

9. The composition of claim 1, wherein:
the at least one of the X's represents the —O— bonded to the aluminum (Al) atom of the aluminosilica of the at least one of the nanoparticles; and
at least one of the each other of the X's represents the additional —O— bonded to the another silicon (Si) atom of the aluminosilica of the at least one of the nanoparticles.

10. The composition of claim 1, wherein the at least some of the functionalized nanoparticles are hydrolyzed, wherein the Q represents:
the —CH(OH)CH$_2$OH group,
the —CH(OH)CH$_2$NH$_2$ group,
the —CH(NH$_2$)CH$_2$OH group, or
the —CH(NH$_2$)CH$_2$NH$_2$ group.

11. The composition of claim 1, wherein:
the at least one of the X's represents the —O— bonded to the aluminum (Al) atom of the aluminosilica of the at least one of the nanoparticles; and
the at least some of the functionalized nanoparticles are non-hydrolyzed, wherein the Q represents:
the epoxide group, and the Z represents the NH group, or the aziridine group, and the Z represents either the oxygen (O) atom or the NH group.

12. The composition of claim 1, wherein the Z represents the NH group.

13. A composition of matter, comprising:
a liquid; and
functionalized nanoparticles suspended in the liquid, at least some of the functionalized nanoparticles comprising nanoparticles of aluminosilica and having a chemical structure of:

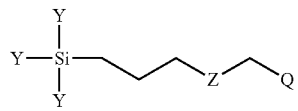

wherein:
at least one of the X's represents —O— bonded to a silicon (Si) atom or an aluminum (Al) atom of the aluminosilica of at least one of the nanoparticles;
each other of the X's represents:
an additional —O— bonded to another silicon (Si) atom or another aluminum (Al) atom of the aluminosilica of at least one of the nanoparticles,
an alkoxy group,
an alkyl group,
a hydroxyl group (OH),
a hydrogen atom, or
a halide;
Z represents:
an oxygen (O) atom, or
an NH group; and
Q represents an aziridine group.

14. A method for forming a suspension of functionalized nanoparticles, the method comprising:
functionalizing nanoparticles with an organosilicon functional group to form functionalized nanoparticles, the nanoparticles each comprising silica and alumina, the functionalized nanoparticles having a chemical structure of:

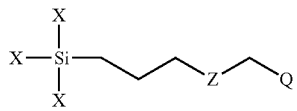

wherein:
at least one of the X's represents —O— bonded to a silicon (Si) atom or an aluminum (Al) atom of at least one of the nanoparticles;
each other of the X's represents:
an additional —O— bonded to another silicon (Si) atom or another aluminum (Al) atom of at least one of the nanoparticles,
an alkoxy group,
an alkyl group,
a hydroxyl group (OH),
a hydrogen atom, or
a halide; and
either:
Z represents an oxygen (O) atom, and Q represents:
an aziridine group,
a —CH(OH)CH$_2$OH group,
a —CH(OH)CH$_2$NH$_2$ group,
a —CH(NH$_2$)CH$_2$OH group, or
a —CH(NH$_2$)CH$_2$NH$_2$ group; or
Z represents an NH group, and Q represents:
an epoxide group,
an aziridine group,
a —CH(OH)CH$_2$OH group,
a —CH(OH)CH$_2$NH$_2$ group,
a —CH(NH$_2$)CH$_2$OH group, or
a —CH(NH$_2$)CH$_2$NH$_2$ group; and
forming a suspension of the functionalized nanoparticles in a liquid.

15. The method of claim 14, wherein functionalizing the nanoparticles with the organosilicon functional group comprises:
hydrolyzing GLYMO; and
bonding the hydrolyzed GLYMO to the nanoparticles to form the functionalized nanoparticles,
wherein Z represents the oxygen (O) atom and Q represents the —CH(OH)CH$_2$OH group.

16. The method of claim 14, wherein functionalizing the nanoparticles with the organosilicon functional group comprises:
bonding GLYMO to the nanoparticles; and
after the bonding, hydrolyzing the GLYMO to form the functionalized nanoparticles,
wherein Z represents the oxygen (O) atom and Q represents the —CH(OH)CH$_2$OH group.

17. The method of claim 14, further comprising, before the functionalizing, modifying an exposed surface of silica nanoparticles to form the nanoparticles comprising the silica and the alumina.

18. The method of claim 17, wherein modifying the exposed surface of the silica nanoparticles comprises replacing a silanol group with Al—OH.

19. The method of claim 14, further comprising maintaining the suspension at a temperature of at least 30° C. for a time period of at least 30 days while maintaining at least 90% of the functionalized nanoparticles in the suspension.

20. A method of using a suspension, comprising:
providing the composition of matter of claim 1; and
injecting the composition of matter into a subterranean well.

* * * * *

UNITED STATES PATENT AND TRADEMARK OFFICE
CERTIFICATE OF CORRECTION

PATENT NO. : 11,981,855 B2  
APPLICATION NO. : 17/657688  
DATED : May 14, 2024  
INVENTOR(S) : Oleg A. Mazyar and Radhika Suresh Page 1 of 2

It is certified that error appears in the above-identified patent and that said Letters Patent is hereby corrected as shown below:

In the Specification

Column 4, Line 47, change "$Fe^{2+}$, $Fe^{2+}$, $Cu^{2+}$," to --$Fe^{2+}$, $Fe^{3+}$, $Cu^{2+}$,--

Column 4, Line 47, change "$Cu^{2+}$, $CO_3^{2+}$, $SO_3^{2+}$, $SO_4^{2-}$," to --$Cu^{2+}$, $CO_3^{2-}$, $SO_3^{2-}$, $SO_4^{2-}$,--

Column 15, Line 35, change "  " to --  --

Column 16, Line 49, change " 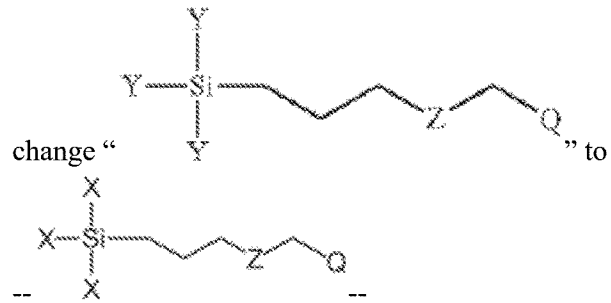 " to

In the Claims

Claim 1, Column 17, Line 53, change " 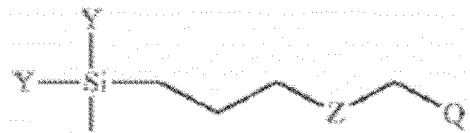 " to

Signed and Sealed this  
Eighteenth Day of March, 2025

Coke Morgan Stewart  
*Acting Director of the United States Patent and Trademark Office*

CERTIFICATE OF CORRECTION (continued)
U.S. Pat. No. 11,981,855 B2